Patented July 6, 1926.

1,591,365

UNITED STATES PATENT OFFICE.

ALFRED H. COWLES, OF SEWAREN, NEW JERSEY, ASSIGNOR TO THE ELECTRIC SMELTING & ALUMINUM COMPANY, OF CLEVELAND, OHIO, A CORPORATION OF OHIO.

PROCESS OF PRODUCING ALUMINA, ALKALI, AND DICALCIUM SILICATE.

No Drawing. Original application filed November 20, 1915, Serial No. 62,486. Divided and this application filed May 17, 1920. Serial No. 382,068.

The object of the invention is to furnish a process for obtaining from silicious materials or mixtures the constitutents that form alkali aluminate from which alumina, and caustic alkali or alkali metal carbonate may be separated. At the same time there is secured a residue, or insoluble product, that can be employed in the manufacture of sand-lime brick, in lieu of lime, and some silica; or in the manufacture of cement, by the addition of one molecule of lime to the calcium oxide therein.

This case is a division of my application Serial No. 62,486, filed November 20th, 1915 (Patent No. 1,508,777, granted September 16, 1924.)

Reference is made to the application and patent just mentioned for a disclosure of the broad invention, while this case is concerned with the disclosure of one of the forms of the generic invention, same consisting in what may be called in its broader aspect a process of separating alumina from compounds containing it, same consisting in heating to a sintering temperature a mixture containing combined alumina and silica, calcium carbonate and sodium carbonate in such proportions that the furnace product shall contain one molecular weight of silica to substantially two molecular weights of calcium oxide and more particularly one molecular weight of alumina to substantially one molecular weight of sodium oxide, dissolving from the resultant mixture sodium aluminate, employing as a solvent water initially containing sodium oxide, so that the resultant solution shall contain materially less than one and seventy-five hundredths and more than one and one-tenth molecules of sodium oxide to one of alumina, and separating the alumina by known means.

The invention is also applicable to the treatment of other alkali metal oxides, as I will proceed now to describe and finally claim.

The substances to be treated can be any mixture, natural or artificial, which when charged in a furnace shall give a sintered or fused product containing, as closely as can be attained, such proportions of oxides as shall be equivalent to the molecular weight of two molecules of an alkali earth oxide (preferably lime CaO) to one molecule of silica ($SiO_2$), and less than one and seventy-six hundredths molecules of an alkali metal oxide ($Na_2O$ or $K_2O$) to one molecule of alumina ($Al_2O_3$). The presence of iron oxide, titanic oxide and some others, does not interfere with the process; they may, or may not be present, since they are practically insoluble under conditions of leaching to be hereafter described. If alkaline earth oxides are present as constituents or impurities in the above minerals or mixtures, they can be allowed for in forming the mixtures.

In making my invention I have availed myself of the known fact that if two molecules of soda ($Na_2O$) and two molecules of lime (CaO) are combined with one molecule each of the acid compounds alumina and silica or very nearly in that ratio, there is formed by sintering or fusion a product from which nearly all of the dialkali, for example, di-sodium aluminate $(Na_2O)_2Al_2O_3$ can be leached away from the orthosilicate of calcium ($SiO_2 2CaO$) or di-calcium silicate. (See U. S. Patent No. 708,561, of September 9th, 1902, to Kayser). And I have discovered that from a previously sintered or melted mixture I can successfully leach away alkali metal aluminate when the molecular weight ratio of alkali metal oxide, $Na_2O$ or $K_2O$, to alumina ($Al_2O_3$) molecules is considerably lower than one and seventy-six hundredths molecules of alkali metal oxide to one molecule of alumina in the solution, leaving the di-calcium silicate, or ortho silicate of calcium ($SiO_2 2CaO$) as the residue containing small amounts of alumina and alkali metal oxide and insoluble impurities such as iron oxide, etc. The liquor that I thus secure is a solution of alkali metal aluminate much more suited for the manufacture of pure alumina and pure alkali metal compound than that obtained by the employment of one and seventy-six hundredths molecules of alkali metal to one of alumina. In order to accomplish this result, it is desirable that the sintered product, which is secured, should immediately be leached and not given time to absorb carbonic acid and water from the atmosphere. With this precaution taken, a ratio of sodium oxide, for example, and alumina in the sintered mixture containing as low as 1.1 molecules of sodium oxide ($Na_2O$) to one molecule of alumina has been leached by me and very satisfactory results secured, though the leaching is somewhat more rapid, if the alkali metal oxide be slightly increased (but it should not be increased to approximate one and seventy-six hundredths molecules of alkali metal oxide to one molecule of $Al_2O_3$ in the solution). The solution of low ratio then becomes one of superior value for use in separating the alumina from the alkali, following the lines of the well-known Bayer process.

Various minerals and mineral compositions or compounds may be used in carrying out the invention, as set forth in Patent No. 1,508,777.

It is desirable to determine the exact composition of the minerals or mineral matter used, and that being done, mixtures of them may be employed, since one can always add sufficient calcium oxide, calcium carbonate, or other alkali earth oxide or calcium salts to give in the product two molecular weights of calicum oxide to one molecular weight of silica. It is preferable that there should also be added to the mixture sufficient alkali metal oxide, either as carbonate or caustic, to elevate the ratio of one alkali metal oxide to one alumina ($Al_2O_3$) sufficiently to facilitate leaching and prevent loss of alumina during leaching of the sintered mixture on account of loss of alkali in furnacing, or by the action of carbonic acid of the air and water, either preparatory to or during the leaching, converting alkali metal oxide or calcium oxide into their respective carbonates. The absorption or carbonic acid goes on very fast, and to the extent that it is absorbed, it lessens the amount of mono-alkali-metal aluminate that passes into the leach water, especially so when there is no excess of alkali over and above the ratio of one alkali metal oxide molecule to one alumina molecule. In no case is it necessary to go above one and seventy-six hundredths molecules of alkali metal oxide to one molecule of alumina in the solution. If alkaline earth oxides be present in the mineral or minerals to which lime or its equivalent is added, allowance must be made therefor, and less lime added in order to secure the ratio of two calcium oxide to one silica in the product. Other alkaline earth oxides or carbonates, either in the lime or in the alkali-silico aluminate material, should be treated as though they were calcium compounds in forming the calculation for the mixture. An excess of lime in the mixture results during leaching, in the formation of insoluble calcium aluminate, thus interfering with high recovery. On the other hand too much silica in the mixture results in leaving in the residue insoluble hydrated aluminum alkali metal silicate, which interferes with the extraction of alumina in leaching. In all cases the mixture should be ground fine enough so that, according to the length of time it is submitted to heat to secure sintering or fusion, it will give a uniformly converted product. Some moisture added to this finely ground mixture is advantageous, especially if the operation is carried on in a rotary furnace, and when there is an alkali-metal carbonate in the mixture, it especially tends to nodulize the mixed materials in the furnace and the lighter dusts are therefore not blown away. Should it be found in practice that there is more dust of certain materials blown out of the furnace than of others, compensation for this should be made in forming the mixture. The temperature of sintering varies somewhat with the nature of the alkali metal oxide present in the mixture, ranging, when sodium oxide is a compound of the mixture around 1300° C. But with potassium or lithium oxide, the temperature will vary slightly from this, these oxides giving more easily fusible products. At this temperature a friable, porous, non-vitreous sinter is obtained in excellent condition for leaching. The temperature may be raised and the mass fused, and still the product can be very efficiently leached. The charge does not tend to adhere to the lining of a rotary kiln in practice, and works at a lower temperature about 150° C., than in the practice of making hydraulic cement. The raw product from the rotary furnace can be used to spread on the land as a fertilizer.

My process can be used where in the resultant product there is but one molecule of the alkali metal oxide to one molecule of ortho-silicate of calcium, or di-calcium silicate, which is insoluble and from which the monosodium aluminate may be leached. When, however, this mixture is used the recovery of alumina, due to loss of alkali metal in furnacing and to the absorption of carbonic acid during the leaching process, is lessened, as there is not quite enough alkali metal to combine with all the alumina and were less than one molecule of alkali metal oxide to one molecule of alumina employed in the mixture, the efficiency of the process increasingly diminishes.

If as a source of calcium oxide in the mixture, I employ calcium chloride and use a lower heat at first passing sufficient steam over the mixture to convert the calcium chloride into calcium oxide, and then elevate the temperature to effect complete sintering, I find there is a tendency for the alkali chloride to pass out of the furnace with the hydro-chloric acid fumes. Hence, in this instance, a sufficient quantity of alkali carbonate should be added to the initial mixture to leave in the sintered product sufficient alkali oxide to permit leaching out of the alkali aluminate.

I have found, that if calcium chloride be mixed with clay and carbon and subjected to temperatures ranging from 1500° to 2000° F. and vapor of water blown over and through this heated mixture, under conditions where a large surface area of the clay is exposed to the action of the vapor of water and alkali earth salt, that the acid radical of said salt will pass off with the fuel gases as HCl and may be condensed or utilized in the production of salts of other bases, or as pure acid, and the product secured as a solid from this step may contain one or more molecules of calcium to one molecule of alumina and two or more molecules of the silica from the clay employed. And knowing the composition of this product, it may be mixed with either or both sodium carbonate and calcium carbonate (or potassium carbonate may be used in lieu of sodium carbonate), so that the ground mixture formed shall contain one molecule of alkali oxide or up to substantially less than one and seventy-six hundredths to one molecule of alumina, and two molecules of calcium oxide, or its equivalent, to one molecule of silica. The latter ratio should be as exact as the mixture can be proportioned. This mixture may now be preferably passed through a furnace of the rotary type and sintered, preferably at a temperature just below its melting point, in which case there is procured a product from which the alkali aluminate is in proper form for leaching, and which will give an alkali aluminate best suited for the economical separation of oxide of aluminum of maximum pureness.

I have leached over eighty-five percent of the alumina from the sinters above described, and higher percentages can be secured.

Having thus fully set forth my invention and the manner in which it is to be carried out what I claim is:

1. The process of separating alumina from compounds containing it, which consists in heating to a sintering temperature a mixture containing combined alumina and silica, calcium carbonate and sodium carbonate in such proportions that the furnaced product shall contain one molecular weight of silica to substantially two molecular weights of calcium oxide, and one molecular weight of alumina to substantially one molecular weight of sodium oxide, dissolving from the resultant mixture sodium aluminate, employing as a solvent water initially containing sodium oxide so that the resultant solution shall contain materially less than one and seventy-five hundredths and more than one-and one-tenth molecules of sodium oxide to one of alumina, and separating the alumina by known means.

2. The process of extracting alumina and an alkali metal compound from a formed furnace charge mixture containing calcium oxide, an alkali metal oxygen compound, alumina, and silica, the latter two in substantially a one to one molecular ratio, together with such impurities as iron oxide and alkali earth metal carbonates, in such proportions that when furnaced the product shall contain substantially two molecular weight proportions of lime to one molecular weight of silica and approximately one of alkali metal oxide to one of alumina, dissolving from such product alkali metal aluminate thereby formed with an alkali solution under conditions to form a liquor containing materially less than one and seventy-five hundredths and more than one and one-tenth of alkali metal oxide molecules to one of alumina, precipitating alumina from said liquor, and separating the alkali metal oxide as an alkali metal compound by well known means.

3. In the process of extracting alkali metal oxide and alumina from mixtures and compounds containing them and having lime and silica in a two to one molecular ratio and wherein the ratio of alkali metal oxide to alumina is substantially the one to one ratio of leucite and feldspar before furnacing, the combining therewith of materials of lower silica content than clay to prevent loss of alkali metal aluminate by rendering less bulky the insoluble product after alkali metal aluminate has been dissolved therefrom by employing initially water containing alkali metal oxide in solution as a solvent.

4. In the process of extracting alkali metal oxide and alumina from mixtures and compounds containing them and having lime and silica in a two to one molecular ratio and wherein the ratio of alkali metal oxide to alumina is substantially one to one, combining therewith the lowering of the molecular ratio of lime to silica below two to one in forming the mixture for furnacing in order to make allowance for basic impurities in the mixture which substitute themselves for lime in their combination with silica to form in the final product the equivalent of dicalcium silicate, furnacing the mixture, and dissolving the furnaced product with a watery solution initially containing alkali metal oxide to produce a final solution containing materially less than one and seventy-five hundredths and more than one and one-tenth alkali metal oxide molecules to one of alumina and separating the alumina by known means.

5. In the production of alumina, an alkali metal compound and a residue, di-calcium silicate, a furnace product made from a charge mixture having therein substantially a one to one ratio of alkali metal oxide to one alumina and containing soluble alkali metal aluminate compounds from which the last named compounds can be dissolved by a watery solution containing initially alkali metal oxide with the production of a solution containing between one and one-tenth and materially less than one and seventy-five hundredths molecules of alkali metal oxide to one of alumina, for the separation of alumina therefrom more economically and with greater facility than by the well known Bayer process.

Signed at New York, in the county of New York, and State of New York, this 11th day of May A. D. 1920.

ALFRED H. COWLES.